US007291991B2

(12) United States Patent
Chen

(10) Patent No.: US 7,291,991 B2
(45) Date of Patent: Nov. 6, 2007

(54) MATRIX INVERTER FOR DRIVING MULTIPLE DISCHARGE LAMPS

(75) Inventor: Wei Chen, Campbell, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 11/249,697

(22) Filed: Oct. 13, 2005

(65) Prior Publication Data

US 2007/0085492 A1 Apr. 19, 2007

(51) Int. Cl.
*H05B 37/02* (2006.01)
*H02M 1/12* (2006.01)

(52) U.S. Cl. ........................................ 315/307; 363/41

(58) Field of Classification Search ................ 315/291, 315/307, 224, 225, 226, 277, 278, 279; 363/25-26, 363/98, 34, 36
See application file for complete search history.

(56) References Cited

U.S. PATENT DOCUMENTS

| | | | |
|---|---|---|---|
| 5,528,192 | A | 6/1996 | Agiman et al. |
| 5,615,093 | A | 3/1997 | Nalbant |
| 5,619,402 | A | 4/1997 | Liu |
| 5,757,173 | A | 5/1998 | Agiman |
| 5,892,336 | A | 4/1999 | Lin et al. |
| 5,923,129 | A | 7/1999 | Henry |
| 5,930,121 | A | 7/1999 | Henry |
| 6,104,146 | A | 8/2000 | Chou et al. |
| 6,198,234 | B1 | 3/2001 | Henry |
| 6,198,245 | B1 | 3/2001 | Du et al. |
| 6,259,615 | B1 | 7/2001 | Lin |
| 6,307,765 | B1 | 10/2001 | Choi |
| 6,396,722 | B2 | 5/2002 | Lin |
| 6,459,602 | B1 | 10/2002 | Lipcsei |
| 6,469,922 | B2 | 10/2002 | Choi |
| 6,501,234 | B2 | 12/2002 | Lin et al. |
| 6,507,173 | B1 | 1/2003 | Spiridon et al. |
| 6,515,881 | B2 | 2/2003 | Chou et al. |
| 6,531,831 | B2 | 3/2003 | Chou et al. |
| 6,559,606 | B1 | 5/2003 | Chou et al. |
| 6,570,344 | B2 | 5/2003 | Lin |
| 6,654,268 | B2 | 11/2003 | Choi |
| 6,657,274 | B2 | 12/2003 | Comeau et al. |
| 6,756,769 | B2 | 6/2004 | Bucur et al. |
| 6,781,325 | B2 | 8/2004 | Lee et al. |
| 6,809,938 | B2 | 10/2004 | Lin et al. |
| 6,853,047 | B1 | 2/2005 | Comeau et al. |
| 6,856,519 | B2 | 2/2005 | Lin et al. |
| 6,864,669 | B1 | 3/2005 | Bucur |
| 6,870,330 | B2 | 3/2005 | Choi |
| 6,873,322 | B2 | 3/2005 | Hartular |
| 6,876,157 | B2 | 4/2005 | Henry |
| 6,888,338 | B1 | 5/2005 | Popescu-Stanesti et al. |
| 6,897,698 | B1 | 5/2005 | Gheorghiu et al. |
| 6,900,993 | B2 | 5/2005 | Lin et al. |

(Continued)

*Primary Examiner*—Shih-Chao Chen
*Assistant Examiner*—Minh Dieu A
(74) *Attorney, Agent, or Firm*—Perkins Coie LLP; Zhou Lu

(57) ABSTRACT

Methods and apparatus are disclosed for converting DC power to AC and for driving multiple discharge lamps and, more particularly, Cold Cathode Fluorescent Lamps (CCFLs), External Electrode Fluorescent Lamps (EEFLs), and Flat Fluorescent Lamps (FFLs). Disclosed methods, among other advantages, allow accurate current sharing among the lamps, minimization of the total number of power switches, and, in general, simplification of the complexity of the control system.

20 Claims, 6 Drawing Sheets

U.S. PATENT DOCUMENTS 6,906,497 B2 6/2005 Bucur et al.
6,927,989 B2 * 8/2005 Fukumoto .................... 363/95
6,936,975 B2 * 8/2005 Lin et al. .................... 315/224
6,946,806 B1 9/2005 Choi
6,979,957 B2 * 12/2005 Lee et al. ................... 315/195
6,979,959 B2 12/2005 Henry
6,999,328 B2 2/2006 Lin
7,023,709 B2 4/2006 Lipcsei et al.
7,042,171 B1 * 5/2006 Lin ............................ 315/291
7,057,611 B2 6/2006 Lin et al.
7,061,183 B1 6/2006 Ball
7,075,245 B2 * 7/2006 Liu ............................ 315/219
7,095,392 B2 8/2006 Lin
7,112,929 B2 9/2006 Chiou
7,112,943 B2 9/2006 Bucur et al.
7,120,035 B2 10/2006 Lin et al.
7,126,289 B2 10/2006 Lin et al.
7,141,933 B2 11/2006 Ball
7,157,886 B2 1/2007 Agarwal et al.
7,161,309 B2 1/2007 Chiou et al.
7,173,382 B2 2/2007 Ball
7,183,724 B2 2/2007 Ball
7,183,727 B2 2/2007 Ferguson et al.
7,187,139 B2 3/2007 Jin
7,187,140 B2 3/2007 Ball
7,190,123 B2 3/2007 Lee et al.
7,200,017 B2 4/2007 Lin
2002/0180380 A1 12/2002 Lin
2005/0030776 A1 2/2005 Lin
2005/0093471 A1 5/2005 Jin
2005/0093482 A1 5/2005 Ball
2005/0093484 A1 5/2005 Ball
2005/0151716 A1 7/2005 Lin
2005/0174818 A1 8/2005 Lin et al.
2005/0225261 A1 10/2005 Jin
2006/0202635 A1 9/2006 Liu
2006/0232222 A1 10/2006 Liu et al.
2006/0279521 A1 12/2006 Lin
2007/0001627 A1 1/2007 Lin et al.
2007/0046217 A1 3/2007 Liu
2007/0047276 A1 3/2007 Lin et al.
2007/0085493 A1 4/2007 Kuo et al.

* cited by examiner

MATRIX INVERTER FOR DRIVING MULTIPLE DISCHARGE LAMPS

TECHNICAL FIELD

The embodiments described below relate, generally, to fluorescent lamps and, particularly, to methods and apparatus for driving multiple discharge lamps such as Cold Cathode Fluorescent Lamps (CCFLs), External Electrode Fluorescent Lamps (EEFLs) and Flat Fluorescent Lamps (FFLs).

BACKGROUND

In LCD televisions, a large number of discharge lamps are used to provide bright backlight and high quality images. The popular discharge lamps in LCD panel backlights include CCFL, EEFL and FFL. Usually, DC to AC switching inverters power these lamps with very high AC voltages.

A common technique for converting a relatively low DC input voltage to a higher AC output voltage is to chop up the DC input signal with power switches, filter out the harmonic signals produced by the chopping, and output a sine-wave-like AC signal. The voltage of the AC signal is stepped up with a transformer to a relatively high voltage since the running voltage could be 500 volts over a range of 0.5 to 6 milliamps. CCFLs are usually driven by AC signals having frequencies that range from 50 to 100 kilohertz.

To ensure uniform backlight brightness and to maximize the lamps lives, lamps need to carry substantially equal currents. Therefore, it is desirable to accurately regulate the lamp currents. While each inverter can drive a pair of lamps in series to achieve good current matching within the two lamps, the large size LCD display panels may require over 20 lamps and, therefore, more than 10 inverters. This significantly increases the cost and size of a display system.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The description of the embodiments of the invention and their applications as set forth herein is illustrative and is not intended to limit the scope of the invention. Variations and modifications of the embodiments are possible and practical alternatives to, or equivalents of the various elements of, the embodiments disclosed herein and are known to those of ordinary skill in the art. Such variations and modifications of the disclosed embodiments may be made without departing from the scope and spirit of the invention.

The presented embodiments relate to circuits and methods for converting DC power to AC power and, specifically, for driving discharge lamps such as CCFLs, EEFLs and FFLs. The disclosed circuits and methods offer, among other advantages, nearly symmetrical voltage waveforms to drive multiple discharge lamps, accurate control of lamp currents to ensure good reliability, and good current matching. These embodiments disclose a matrix inverter which reduces the cost by more than 30% while maintaining the same current sharing accuracy. These inverters have lower component count, smaller size, and lower cost.

In the following description, several specific details are presented to provide a thorough understanding of the embodiments of the invention. While the full-bridge inverter topology is used for the explanation, one skilled in the relevant art will recognize that the invention can be practiced without one or more of the specific details, or in combination with other components, or in other inverter topology, etc. In some instances, well-known implementations or operations are not shown or described in detail to avoid obscuring some aspects of various embodiments of the invention.

Figure 1:
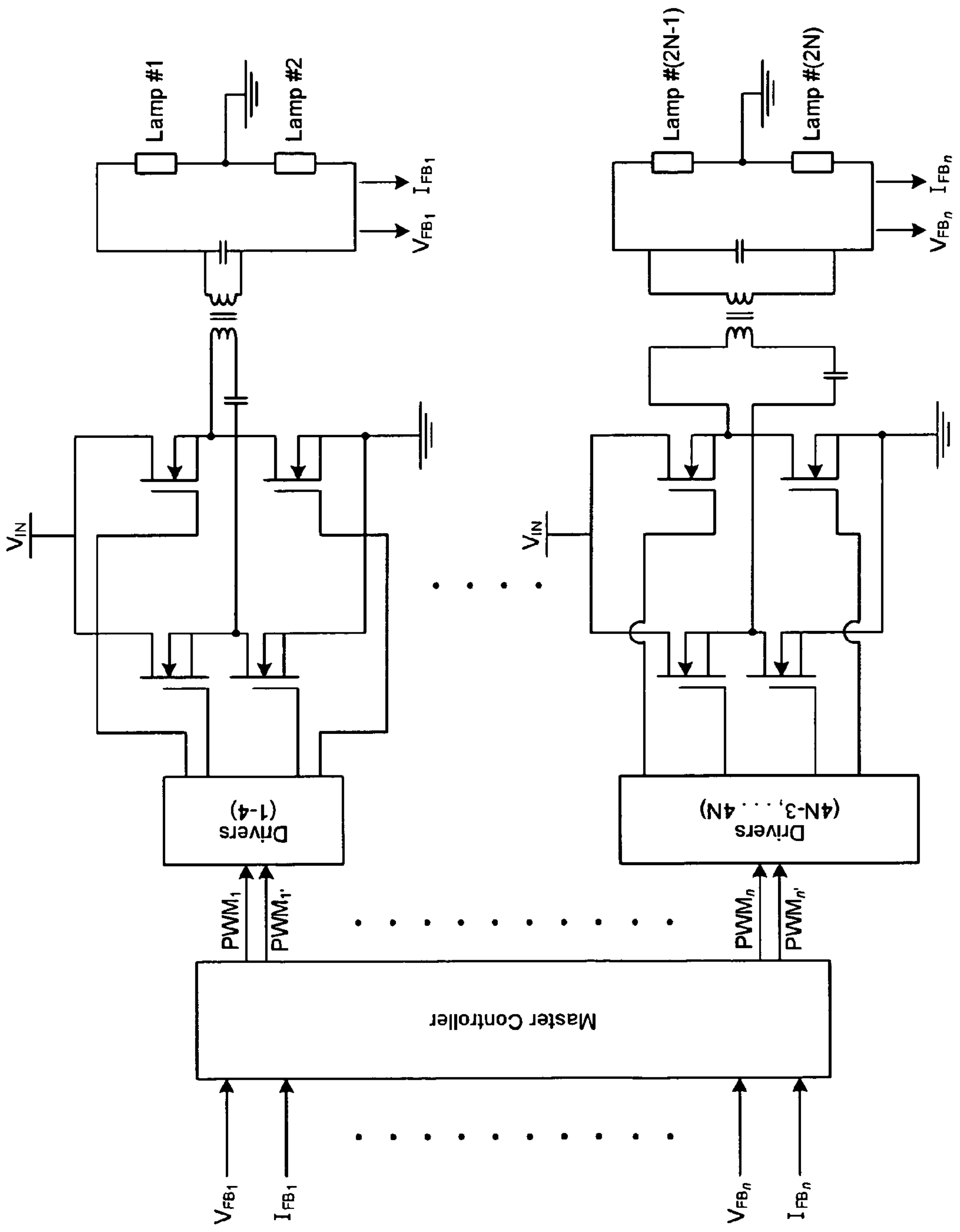
FIG. 1 (Prior Art)
FIG. 1 shows a prior-art circuit using multiple inverters for driving multiple lamps.

FIG. 1 shows a prior-art circuit that uses multiple inverters for driving multiple lamps. If the lamp voltage is not very high, it is also common to drive two lamps in series in a floating configuration to achieve substantially identical currents through the two lamps. However, to ensure good current matching among 2N lamps, N inverters must be used in the prior art arrangements. Each inverter receives the lamp current feedback and regulates the lamp current based on a brightness command.

To minimize the EMI interference, these inverters must be synchronized to a central clock. This may require a central control IC to manage the clock, and fault protection means. These requirements increase the complexity and the cost of the system. In addition, if the full-bridge inverter topology is employed, a total of 4N switches (preferably MOSFET) are required, along with a total of 4N MOSFET drivers.

Figure 2:
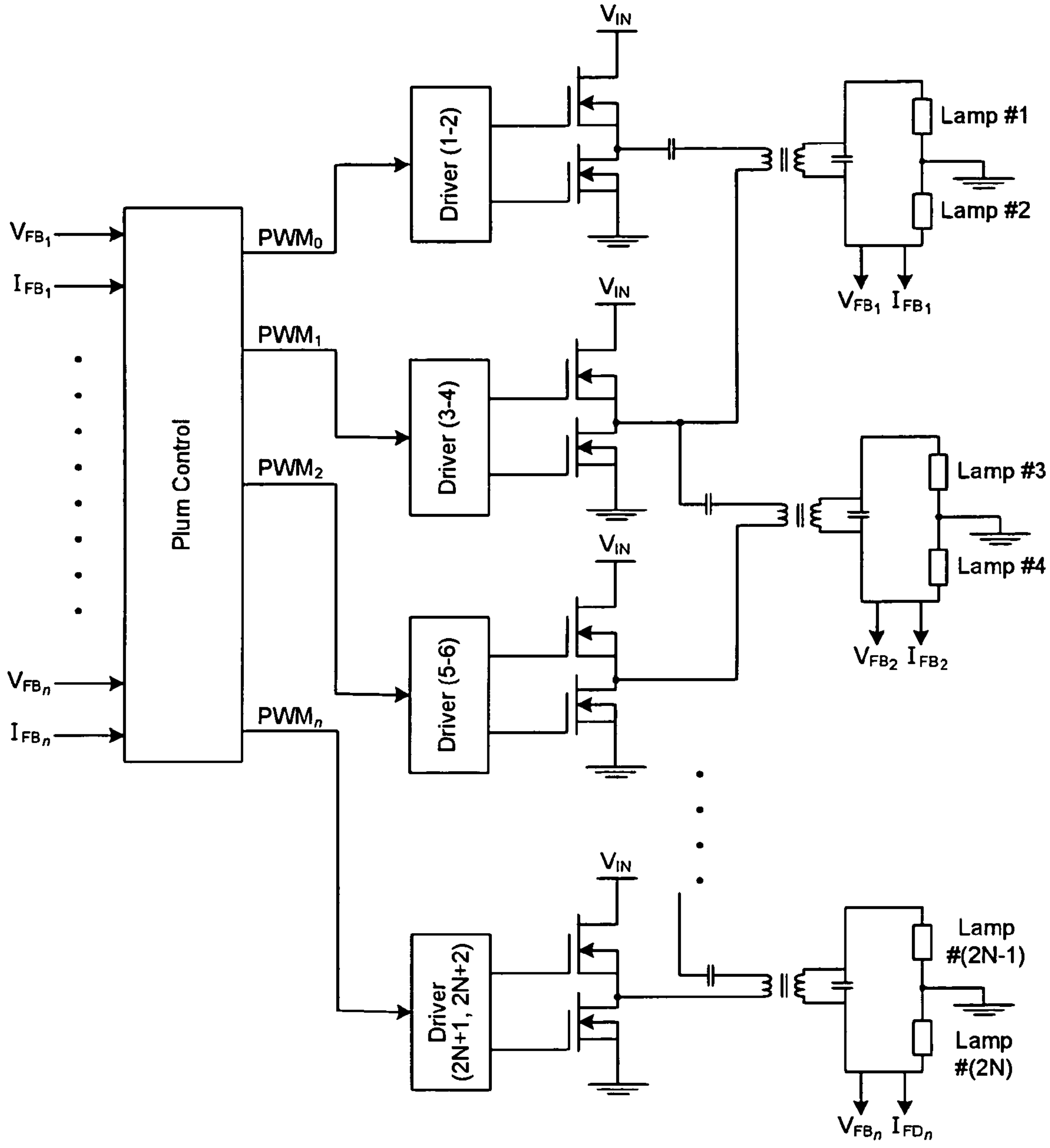
FIG. 2 shows a simplified schematic diagram of a matrix inverter based on full-bridge inverter topology, in accordance with an embodiment of the invention.

FIG. 2 shows an embodiment of the proposed matrix inverter, based on the full-bridge inverter topology. In this embodiment, for powering 2N lamps in floating configuration, the inverter only needs 2N+2 power switches—reducing the controller cost and complexity—wherein all switches are turned on and off at the same frequency or at the same time.

Figure 3A:
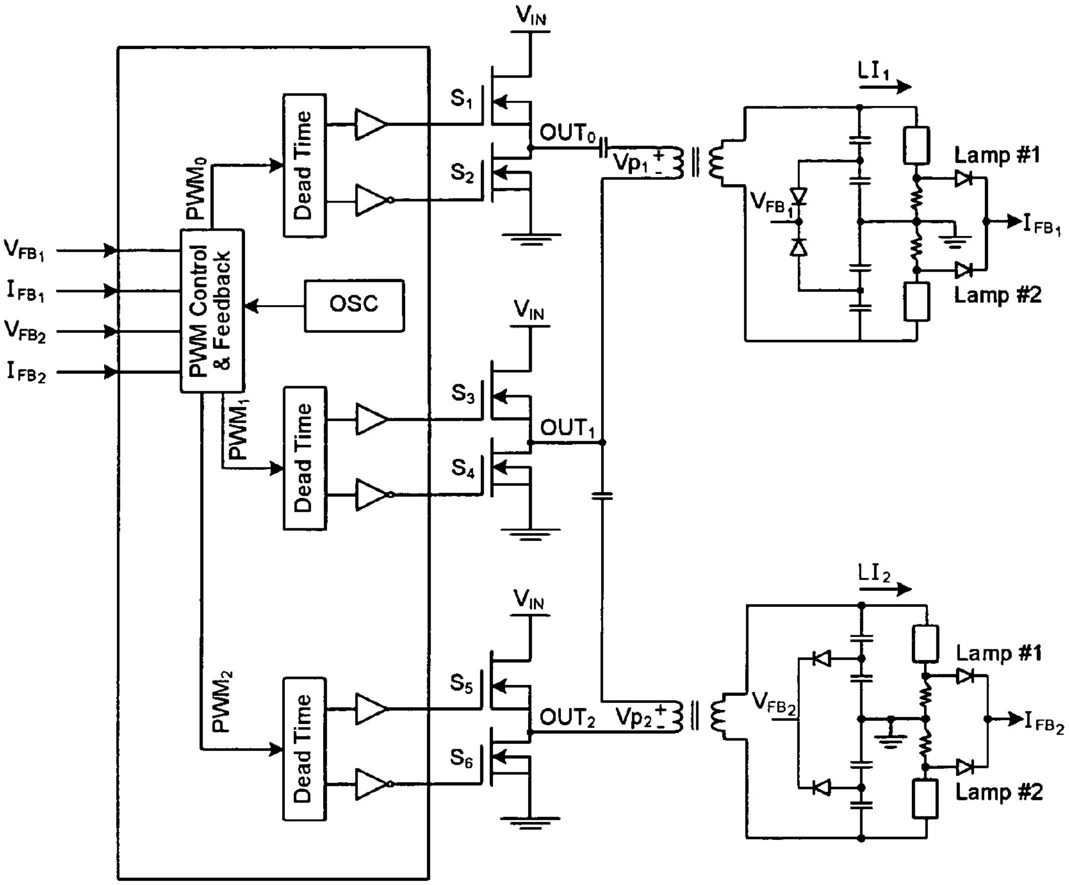
FIG. 3A is a simplified circuit diagram for accurate control of individual lamp currents.

FIG. 3A illustrates a simple control scheme for realizing independent and accurate control of individual lamp currents. The example shown in FIG. 3A drives 4 lamps. To simplify the description, it is assumed that the top and the bottom switches in each totem-pole operate at 50% duty cycle; however, the duty cycle of each totem-pole can be varied to achieve higher degrees of regulation flexibility.

In this example, the phase between adjacent pairs of totem-poles is controlled. If the phase of two adjacent totem-poles is 180 degrees, the transformer connected between these two totem-poles receives the maximum driving volt-second on the transformer primary side and, therefore, produces the maximum lamp current on the transformer secondary side. If the phase of the adjacent totem-poles is zero degrees, the transformer between these two totem-poles will produce zero lamp current. Therefore, the phases between the two adjacent totem-poles may be used to modulate the individual lamp currents.

Figure 3B:
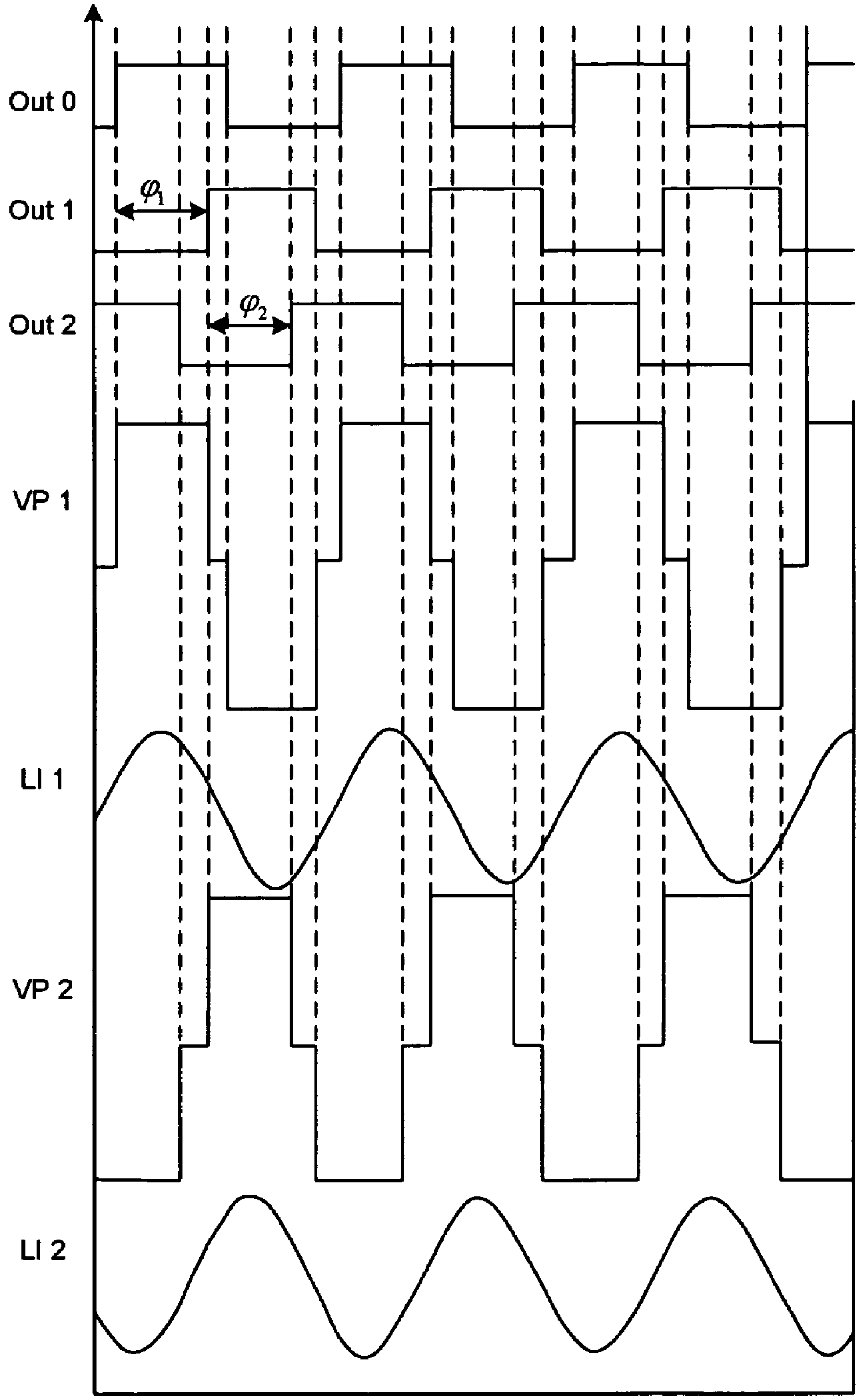
FIG. 3B depicts details of current, voltage, and phase relationships in the circuit shown in FIG. 3A.

FIG. 3B depicts details of current, voltage, and phase relationships in the circuit shown in FIG. 3A. The phase $\phi_1$ modulates lamp current $LI_1$, and the phase $\phi_2$ controls the lamp current $LI_2$. Therefore, the currents of all 4 lamps can be accurately regulated to the same level. This scheme only requires 6 power switches in contrast with the prior art shown in FIG. 1, which requires 8 power switches. As also shown in FIG. 3A, the middle totem-pole conducts primary winding currents of both adjacent transformers. Because of the phase shift, the RMS current stress of these switches is lower than the direct sum of the two primary winding currents, resulting in lower conduction loss in power switches.

Figure 4:
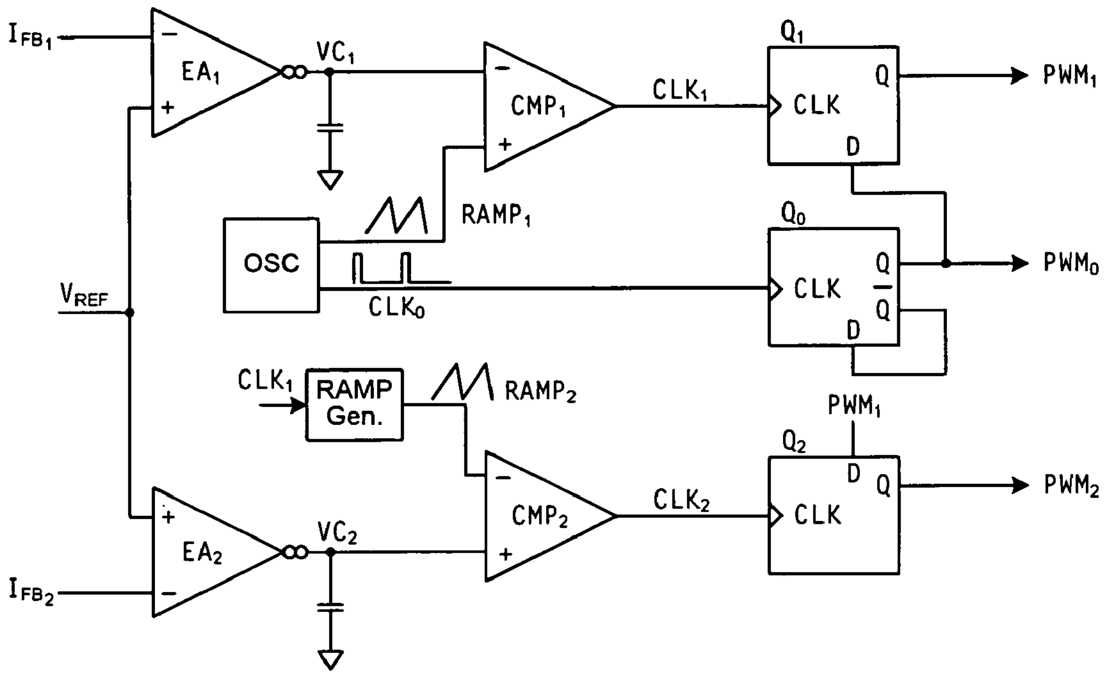
FIG. 4 shows a simplified circuit diagram for realization of the control portion shown in FIG. 3A.

FIG. 4 shows a schematic diagram for realizing the control function depicted in FIG. 3A. In this example also, the duty cycles of the totem-pole switches are fixed at about 50%. The oscillator block OSC generates the clock signal $CLK_0$ which is fed into the D-flipflop $Q_0$. The output of $Q_0$ becomes $PWM_0$ which drives the first totem-pole of the MOSFET switches $S_1$ and $S_2$. The output of the first lamp current feedback amplifier $EA_1$, is compared, in $CMP_1$, with a ramp ($RAMP_1$) derived from $CLK_0$ to generate the first clock signal $CLK_1$. Clock signal $CLK_1$ and $PWM_0$ combine to drive Flip-flop $Q_1$ to generate $PWM_1$, which in turn drives the second totem-pole switches $S_3$ and $S_4$. Similarly, $CLK_2$ is derived from comparing the second error amplifier $EA_2$ output and $RAMP_2$, in $CMP_2$, where $RAMP_2$ is generated from $CLK_1$. $CLK_2$ and $PWM_1$ combine to generate $PWM_2$ which drives the third totem-pole switches $S_5$ and $S_6$.

Figure 5:
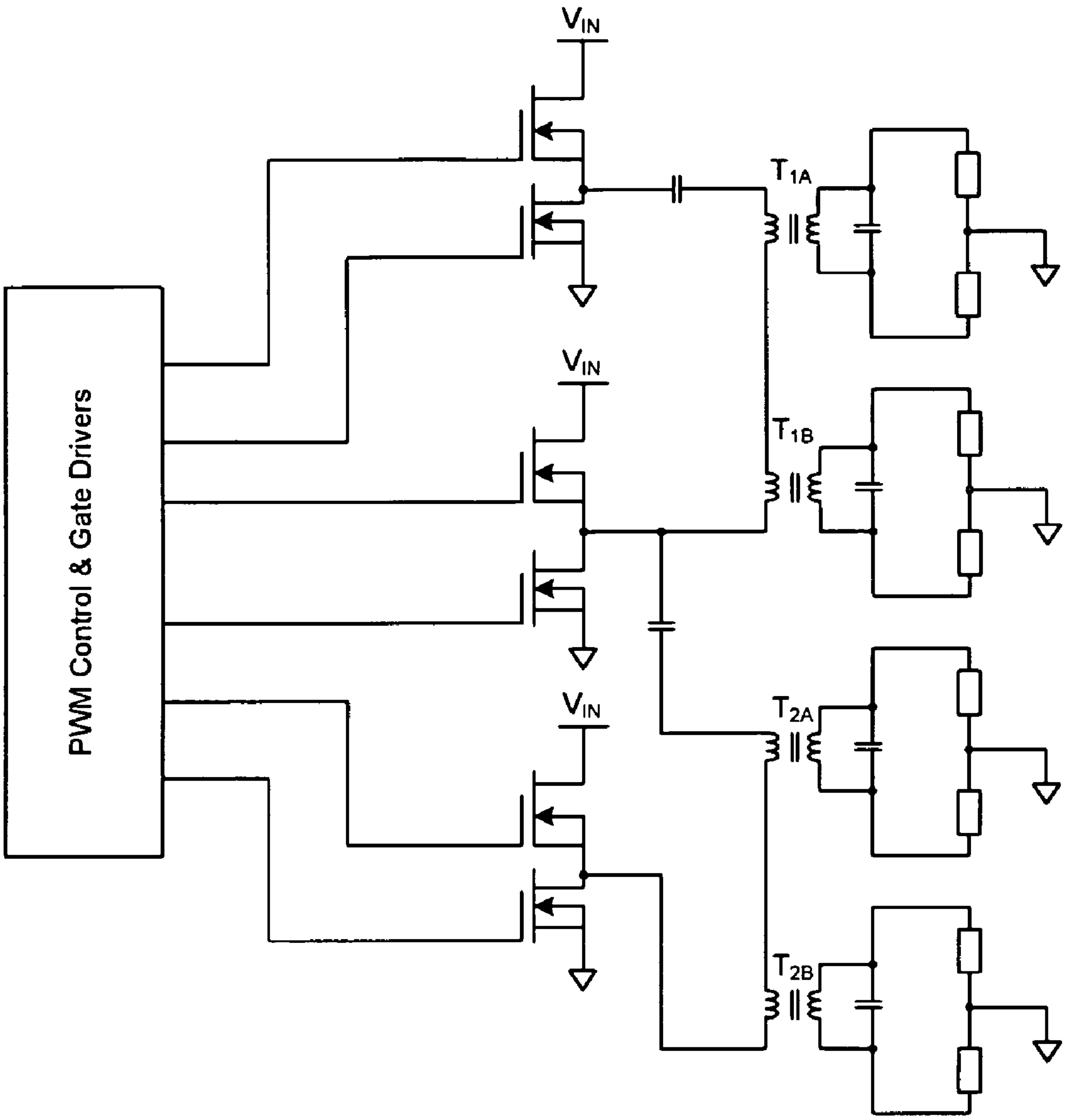
FIG. 5 shows an example for combining transformers.

FIG. 5 shows an example in which transformers are combined. In this embodiment, by combining the matrix inverter scheme with the passive current sharing scheme, the matrix inverter will drive a greater number of lamps with good current sharing. By having the primary windings of two transformers in series, the matrix inverter can drive 4N lamps with only 2N+2 switches in a full-bridge inverter configuration.

The configuration shown in FIG. 5 also has other advantages, such as reliable lamp ignition. For example, if the lamps in the $T_{1A}$ secondary are ignited, the large current flow in the primary winding will be reflected to the secondary winding of $T_{1B}$. If those two lamps are not ignited, a large current will flow into the resonant cap and generate a high voltage to strike the lamps.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

The teachings of the invention provided herein can be applied to other systems, not necessarily the system described above. The elements and acts of the various embodiments described above can be combined to provide further embodiments.

Changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. An apparatus for driving one or more discharge lamps, the apparatus comprising:

- a PWM (pulse-width modulation) controller for controlling switch-drivers;
- at least six switches, wherein every pair of switches are stacked in a totem-pole configuration, forming at least three totem-poles;
- at least three switch-drivers, wherein to generate PWM signals, each switch-driver turns on or off the two switches of one totem-pole;
- at least one transformer that includes a primary winding and a secondary winding, wherein the primary winding of the transformer is connected between the outputs of the at least two totem-poles, and wherein the secondary winding of the transformer feeds one discharge lamp or multiple discharge lamps in series, and wherein if there are more than one transformer and more than two corresponding totem-poles, at least one totem-pole is shared by the primary windings of two transformers; and a configuration wherein the PWM controller receives current and voltage feedback from secondary sides of the transformers and wherein the PWM controller controls the phases between PWM signals to regulate current in the secondary windings of the at least one transformer.

2. The apparatus of claim 1, wherein the apparatus drives 2N discharge lamps and comprises:

one PWM controller;

2N+2 switches (N+1 totem-poles);

N+1 switch-drivers; and

N transformers, wherein N−1 totem-poles are shared by pairs of transformers.

3. The apparatus of claim 1, wherein the switches are MOSFETs and switch-drivers are gate-drivers.

4. The apparatus of claim 1, wherein:

a first capacitor is connected in series with the primary winding of each transformer; and a second capacitor is connected in parallel with the secondary winding of each transformer.

5. The apparatus of claim 1, wherein at least one primary winding is replaced by at least two primary windings (connected in series) of two replacement transformers, and wherein the replacement series primaries support at least two replacement secondary windings, and wherein each replacement secondary winding feeds one or two discharge lamps.

6. The apparatus of claim 1, wherein inverters formed by transformers are configured as half-bridge or full-bridge, and wherein totem-pole duty cycle, phase difference between totem-poles, or both, are regulated.

7. An apparatus for driving multiple lamps with balanced currents, the apparatus comprising:

means for generating square wave AC voltage signals;

means for controlling square wave AC voltage generators;

transformers for transforming square wave AC signals to other AC signals to power one or multiple lamps, wherein primary windings of the transformers are connected from each end to one square wave AC generating means, and wherein at least one square wave AC signal generating means is shared by two primary windings; and means for feeding back a voltage and a current from secondary sides of the transformers to control the square wave AC signal generators, wherein the means for controlling square wave AC voltage generators controls the phases between the square wave AC voltage signals to regulate current in the secondary windings of the transformers.

8. The apparatus of claim 7, wherein the apparatus drives 2N discharge lamps and comprises:

N+1 square wave AC signal generating means; and

N transformers, wherein N−1 square wave AC signal generating means are shared by pairs of primary windings.

9. The apparatus of claim 7, wherein square wave AC signal generating means comprises two switches in totem-pole configuration, and wherein the switches are FET transistors.

10. The apparatus of claim 7, wherein:

a first capacitor is connected in series with the primary winding of each transformer; and a second capacitor is in parallel with the secondary winding of each transformer.

11. The apparatus of claim 7, wherein inverters formed by transformers are configured as half-bridge or full-bridge, and wherein duty cycle of square wave signals are regulated.

12. The apparatus of claim 7, wherein at least one primary winding is replaced by at least two primary windings (connected in series) of two replacement transformers, and supports at least two replacement secondary windings of said two replacement transformers, and wherein each replacement secondary winding of said two replacement transformers feeds at least one discharge lamp.

13. A method for driving multiple discharge lamps and balancing the lamps currents, the method comprising:

connecting one or multiple lamps in series with a secondary winding of a transformer that includes a primary winding and a secondary winding;

connecting each end of the primary winding of the transformer to a separate regulated square wave AC signal, wherein if there are more than one transformers, at least one square wave AC signal is connected to the primary windings of two transformers, and wherein each square wave AC voltage is generated using two switches in a totem-pole configuration; and regulating the square wave AC voltage signals using voltage and current feedbacks from secondary winding connections, wherein the totem-pole switches are turned on or off based on the feedbacks and wherein the phases between the square wave AC voltage signals are controlled to regulate current in the secondary windings of the transformers.

14. The method of claim 13, wherein 2N discharge lamps are powered, and wherein one square wave controller regulates 2N+2 switches that provide primary windings of N transformers with regulated square wave AC voltage signals and induce AC signals in secondary windings of the N transformers to drive the 2N lamps.

15. The method of claim 13, wherein the switches are FET transistors and are regulated by controlling the transistor gates.

16. The method of claim 13, wherein:

at least one capacitive element is connected in series with the primary winding of each transformer; and at least one capacitive element is connected in parallel with the secondary winding of each transformer.

17. The method of claim 13, wherein at least one primary winding connected between two regulated square wave signals is replaced by at least two primary windings (connected in series) of two replacement transformers and supports at least two secondary windings of the two replacement transformers, and wherein each secondary winding of the two replacement transformers, in turn, feeds one or multiple discharge lamps.

18. The method of claim 13, wherein inverters formed by transformers are configured as half-bridge or full-bridge, and wherein square wave duty cycle, phase difference between square wave signals, or both, are regulated.

19. An apparatus for driving multiple discharge lamps with current balancing, the apparatus comprising:

a PWM (pulse-width modulation) controller for controlling switch-drivers;

a switching network for converting DC voltages into at least two AC voltages, wherein:

a first set of switching devices generates a first AC voltage; and a second set of switching devices generates a second AC voltage, and wherein at least one switching device is shared between the first and the second set of switching devices;

at least two transformers that include primary windings which receive each AC voltage individually and secondary windings which connect to the discharge lamps; and a configuration wherein the PWM controller receives current and voltage feedback from secondary sides of the transformers and wherein the PWM controller controls the phases between PWM signals to regulate current to the discharge lamps.

20. The apparatus of claim 19, wherein at least one primary winding connected between two PWM signals is replaced by at least two primary windings (connected in series) of two replacement transformers and supports at least two secondary windings of the two replacement transformers, and wherein each secondary winding of the two replacement transformers, in turn, feeds one or multiple discharge lamps.

* * * * *